United States Patent
Jamart

(10) Patent No.: US 12,286,375 B2
(45) Date of Patent: Apr. 29, 2025

(54) GLASS SHEET COMPRISING AN ENAMELED ZONE AND AN UNDERLAYER

(71) Applicant: SAINT-GOBAIN GLASS FRANCE, Courbevoie (FR)

(72) Inventor: Juliette Jamart, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 695 days.

(21) Appl. No.: 17/636,654

(22) PCT Filed: Sep. 4, 2020

(86) PCT No.: PCT/EP2020/074706
§ 371 (c)(1),
(2) Date: Feb. 18, 2022

(87) PCT Pub. No.: WO2021/043954
PCT Pub. Date: Mar. 11, 2021

(65) Prior Publication Data
US 2022/0298061 A1    Sep. 22, 2022

(30) Foreign Application Priority Data
Sep. 4, 2019   (FR) ..................................... 1909708

(51) Int. Cl.
  *B32B 15/04*    (2006.01)
  *B32B 17/06*    (2006.01)
  *C03C 8/02*     (2006.01)
  *C03C 17/245*   (2006.01)

(52) U.S. Cl.
  CPC .............. *C03C 8/02* (2013.01); *C03C 17/245* (2013.01); *C03C 2204/04* (2013.01)

(58) Field of Classification Search
  CPC .................................................. C03C 17/3411
  USPC .......................................................... 428/426
  See application file for complete search history.

(56) References Cited

U.S. PATENT DOCUMENTS

| 1,942,686 | A | | 1/1934 | Colbert et al. |
| 4,827,274 | A | * | 5/1989 | Armbruster .......... H01Q 1/1271 343/712 |
| 11,192,821 | B2 | * | 12/2021 | Jamart ................ C03C 17/3681 |
| 11,427,501 | B2 | * | 8/2022 | Maria ................. C03C 17/3411 |
| 11,911,997 | B2 | * | 2/2024 | Flamary-Mespoulie .................... C03C 17/3649 |
| 2019/0152845 | A1 | * | 5/2019 | Rufino ................. C03C 17/366 |
| 2020/0392037 | A1 | * | 12/2020 | Jamart ............... C03C 17/3681 |

FOREIGN PATENT DOCUMENTS

| EP | 0 098 220 A1 | 1/1984 |
| EP | 0 807 611 A1 | 11/1997 |
| WO | WO 2015/101744 A1 | 7/2015 |

(Continued)

OTHER PUBLICATIONS

International Search Report as issued in International Patent Application No. PCT/EP2020/074706, dated Oct. 30, 2020.

*Primary Examiner* — Lauren R Colgan
(74) *Attorney, Agent, or Firm* — Pillsbury Winthrop Shaw Pittman LLP

(57) ABSTRACT

A material includes a glass sheet, one face of which includes an enameled zone coated with an opaque enamel layer and a nonenameled zone, an underlayer which is not an enamel layer being positioned solely in at least a part of the enameled zone, under the enamel layer and in contact therewith.

17 Claims, 1 Drawing Sheet

(56) References Cited

FOREIGN PATENT DOCUMENTS

| WO | WO 2018/220325 A1 | 12/2018 |
| WO | WO 2019/106264 A1 | 6/2019 |

\* cited by examiner

[Fig. 1]
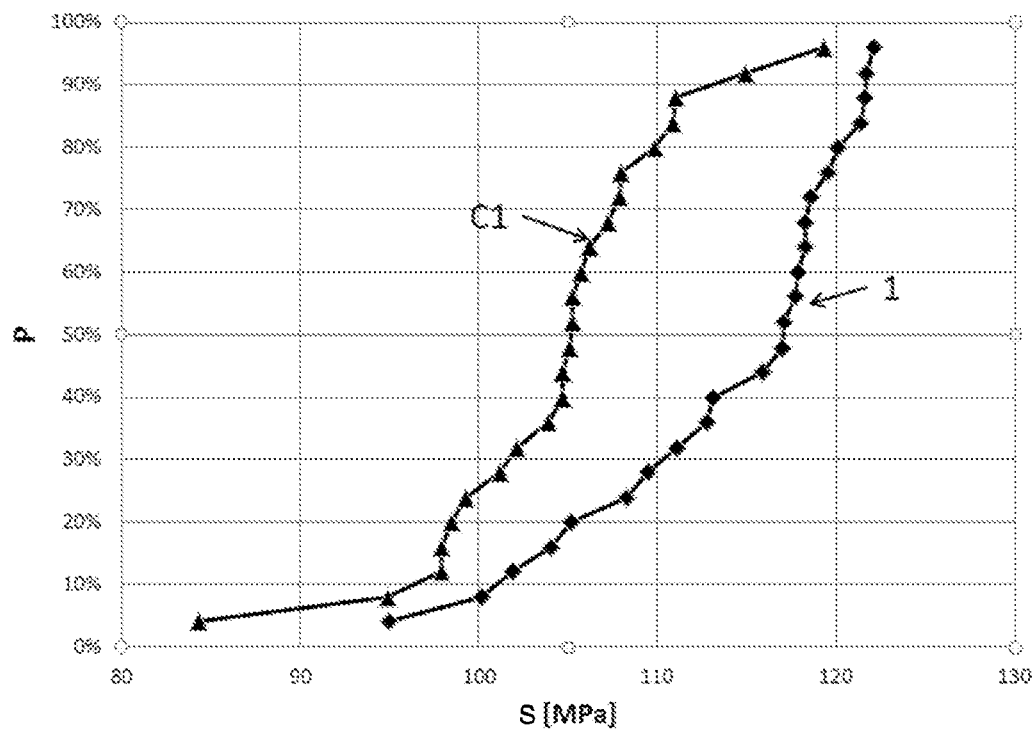
[Fig. 2]
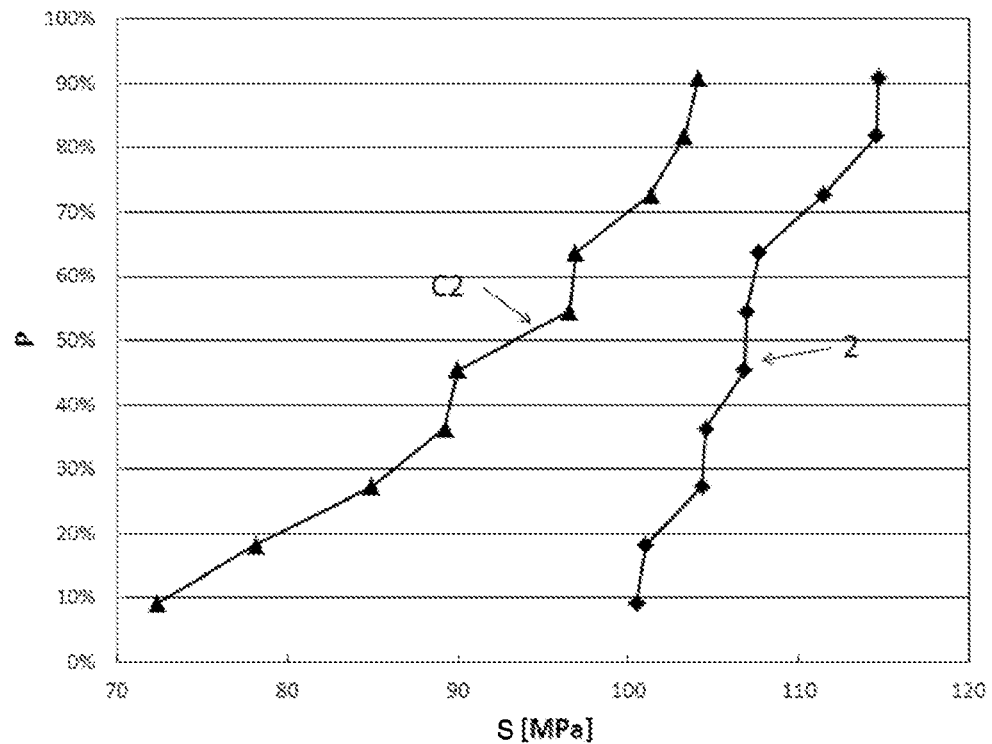

GLASS SHEET COMPRISING AN ENAMELED ZONE AND AN UNDERLAYER

CROSS-REFERENCE TO RELATED APPLICATIONS

This application is the U.S. National Stage of PCT/EP2020/074706, filed Sep. 4, 2020, which in turn claims priority to French patent application number 1909708 filed Sep. 4, 2019. The content of these applications are incorporated herein by reference in their entireties.

The invention relates to the field of glazings, in particular automobile glazings, such as glazings for the back window or for the roof of a motor vehicle.

Such glazings are often monolithic glazings, comprising a single sheet of thermally tempered glass. They can also be laminated glazings, in which two sheets of glass are adhesively bonded by means of a lamination interlayer. The latter makes it possible in particular to retain shards of glass in the event of breakage, but also provides other functionalities, in particular in terms of resistance to burglary or of improving the acoustic properties.

Layers of enamel, normally black and opaque, are often deposited on part of the glazing, generally in the form of a peripheral strip intended to conceal and protect against ultraviolet radiation the polymeric seals used for fixing and positioning the glazing in the bodywork openings. In a monolithic glazing, the enamel layers are normally placed on face 2, thus on the side of the passenger compartment. In a laminated glazing, the enamel layers are generally placed on face 2, therefore in contact with the lamination interlayer.

The enamel is generally obtained by firing, above 500° C., a composition comprising a glass frit and pigments. The firing stage is generally carried out simultaneously with the bending and/or the tempering of the glass sheet.

It has been observed that the presence of an enamel layer causes a deterioration in the mechanical strength of the coated glass. It would appear that the presence of heterogeneities in the enamel layer (pores, pigments) facilitates the initiation of cracks which can propagate into the underlying glass. The difference between the thermal expansion coefficients of the enamel and of the glass and the diffusion of entities between the glass and the enamel also result in the creation of residual stresses which locally weaken the enameled glass.

This local weakening can result in breakage of the glazing under the effect of mechanical or thermomechanical stresses, for example under the effect of an impact (gravel, hail, and the like) or of sudden changes in temperature.

The application WO2018/220325 solves this problem by replacing the enamel with a silicate-based paint, which however requires modifying the process for the manufacture of the glazings.

The aim of the invention is to overcome these disadvantages by providing an enameled glazing exhibiting a better mechanical strength.

To this end, a subject matter of the invention is a material comprising a glass sheet, one face of which comprises an enameled zone coated with an opaque enamel layer and a nonenameled zone, an underlayer which is not an enamel layer being positioned solely in at least a part of the enameled zone, under said enamel layer and in contact therewith.

Another subject matter of the invention is a process for obtaining such a material, comprising the deposition of an underlayer on a part of a face of a glass sheet and then the deposition of an opaque enamel layer in at least the zone coated with the underlayer.

Finally, a subject matter of the invention is a glazing, in particular a back window, a roof or a windshield, of a motor vehicle, comprising a material according to the invention.

The glass sheet is preferably made of soda-lime-silica glass. It is advantageously obtained by the float-glass method. However, other glass compositions are possible, for example compositions of the borosilicate or aluminosilicate type.

The glass sheet can be made of clear glass or of tinted glass, preferably of tinted glass, for example tinted green, gray or blue. To do this, the chemical composition of the glass sheet advantageously comprises iron oxide, in a content by weight ranging from 0.5% to 2.5%. It can also comprise other coloring agents, such as cobalt oxide, chromium oxide, nickel oxide, erbium oxide or also selenium.

The glass sheet exhibits a thickness preferably of between 0.7 and 5 mm, in particular between 1 and 4 mm, indeed even between 1.5 and 3 mm. The glass sheet preferably exhibits a surface area of at least 1 $m^2$.

The glass sheet can be flat or bent. It is generally flat during the stages of deposition of the underlayer and of the enamel layer. It is subsequently preferably bent and thus has a bent shape in the final glazing.

The enameled zone preferably represents between 2% and 25%, in particular between 3% and 20%, indeed even between 5% and 15%, of the surface area of the coated face. The enameled zone is preferably provided in the form of a peripheral strip. The term "peripheral strip" is understood to mean a strip closed on itself which, from each point of the periphery of the glass sheet, extends toward the inside of the glass sheet over a certain width, typically of between 1 and 20 cm.

The nonenameled zone is usually uncoated (in other words, the glass is bare, not coated with any layer). Alternatively, it can be coated with a stack of thin layers, for example comprising a low emissivity layer, in particular based on silver or based on a transparent electrically conducting oxide (TCO), such as indium tin oxide or doped tin or zinc oxides.

The underlayer is positioned solely in at least a part of the enameled zone. It is thus not present in the nonenameled zone.

The underlayer is positioned under the enamel layer and in contact with the enamel layer. Preferably, the underlayer is in contact with the glass sheet.

The presence of this underlayer makes it possible to improve the mechanical strength of the glazing, as demonstrated in the continuation of the text.

According to a first embodiment, the underlayer is positioned in a part only of the enameled zone. Preferably, the zone coated with the underlayer represents between 1% and 90%, in particular between 2% and 60%, indeed even between 3 and 40, and even between 4% and 10%, of the surface area of the enameled zone. In this case, it is desired to avoid very local weakenings, for example in zones of soldering of electrical connectors, as explained in more detail in the continuation of the text.

According to a second embodiment, the underlayer is positioned in the whole of the enameled zone. It is then a question of avoiding weakenings throughout the enameled zone.

The underlayer is preferably based on, indeed even constituted by, an oxide, a nitride or an oxynitride. The underlayer should not be an enamel layer.

The underlayer is advantageously based on silicon oxide, indeed even constituted or essentially constituted by silicon oxide. Being devoid of coloration, such a layer makes it possible not to affect the appearance in reflection of the enamel layer.

The underlayer is preferably a single layer, and not a stack of layers.

The underlayer is preferably a sol-gel layer. In this case, the deposition of the underlayer is carried out by a sol-gel process. The sol-gel layer is preferably based on, indeed even constituted by, silicon oxide.

A sol-gel process is a process in which a sol containing precursors of the layer to be produced is deposited on the glass sheet by various means, such as spray coating, curtain coating, laminar flow coating, roll coating, screen printing, and the like. Deposition by screen printing is preferred here since it makes it possible easily to deposit the underlayer only in the desired parts of the enameled zone.

The sol preferably contains organometallic precursors of the layer to be produced, for example tetraethyl orthosilicate (TEOS). The layer is subsequently generally dried before deposition of the enamel layer and then annealed in order to densify it. The annealing takes place preferably during the same stage as the firing of the enamel, generally during the bending and/or the tempering of the glass sheet.

Alternatively, the deposition of the underlayer can be carried out by PVD or CVD (chemical vapor deposition) methods, for example by cathode sputtering, or alternatively by plasma-enhanced chemical vapor deposition (PECVD), optionally under atmospheric pressure (APPECVD). It is then possible to position masks in order to deposit the underlayer only in the parts of the enameled zone where it will be useful.

The thickness of the underlayer is preferably between 10 nm and 1 μm. When the underlayer is deposited by cathode sputtering or by (AP)PECVD, the thickness of the underlayer is preferably between 20 nm and 200 nm, in particular between 30 nm and 100 nm. When the underlayer is a sol-gel layer, the thickness of the underlayer is preferably between 50 nm and 800 nm, in particular between 100 nm and 300 nm.

These figures apply to the thickness of the underlayer in the final material, after firing the enamel. The material claimed, however, also covers the intermediate material before firing the enamel. In this case, and when the underlayer is a sol-gel layer not yet densified, the thickness of the underlayer can be greater, in particular between 500 nm and 3 μm.

The term "enamel layer" is understood to mean both the layer before firing and after firing.

Before firing, the enamel layer comprises a glass frit, pigments and an organic medium. After firing, the enamel layer comprises pigments and a vitreous matrix obtained by melting the glass frit.

The glass frit and/or the vitreous matrix is preferably constituted by a zinc and/or bismuth borosilicate glass. At least one, in particular each, pigment is preferably based on an oxide or a sulfide of iron, chromium, copper, cobalt and/or manganese.

The enamel layer is preferably obtained by screen printing a fluid enamel composition comprising a glass frit, pigments and an organic medium. To do this, the enamel composition is deposited, in particular using a doctor blade, on the glass sheet through meshes of a screen printing screen. The meshes of the screen are sealed in the part corresponding to the zones of the glass sheet which it is not desired to coat, so that the enamel composition can only pass through the screen in the zones to be printed, according to a predefined pattern. Other deposition techniques, such as digital printing techniques, are also possible.

Before firing, the enamel exhibits a thickness preferably of between 10 and 30 μm, in particular between 15 and 25 μm. After firing, the thickness of the enamel layer is preferably between 5 and 15 μm, in particular between 7 and 13 μm.

The enamel is preferably black, and advantageously exhibits a colorimetric coordinate L* in reflection on the enamel side of less than 5, in particular than 3.

The process according to the invention preferably comprises a stage of firing the enamel layer, generally during the tempering and/or the bending of the glass sheet. If appropriate, this stage is also used to densify the sol-gel underlayer. This stage employs temperatures preferably ranging from 550 to 720° C.

The glazing according to the invention can comprise a single glass sheet, generally thermally tempered. Alternatively, the glazing can be a laminated glazing, in which the glass sheet of the material according to the invention is adhesively bonded to another glass sheet by means of a lamination interlayer, for example made of polyvinyl butyral. The glass sheets are then not thermally tempered.

The glazing according to the invention can be a back window of a motor vehicle.

The enamel layer can be surmounted, in a part of the enameled zone, by electrically conducting tracks, in particular in the form of silver paste. These tracks are in particular collector strips intended to electrically supply heating wires also made of silver paste. Preferably, a metal connector is soldered to at least one collector strip, in a zone referred to as "soldering zone", using a lead-free alloy. In this embodiment, the underlayer is preferably positioned in line with the soldering zone, and in particular only in line with this zone. This is because it turns out that the weakening due to the enamel touched on in the introduction of the present text is particularly crucial in this context because it can lead to the breakage of the glazings during aging tests called the TCT test and comprising 60 cycles of variations in temperatures between −40 and +105° C. at a voltage of 14 V.

According to a preferred embodiment, the material thus comprises, above the enamel layer, a collector strip made of silver paste in a "soldering zone" in which the collector strip is intended to be soldered, or is soldered, to a metal connector, and the underlayer is positioned in line with this soldering zone, in particular only in line with this soldering zone. The silver paste comprises silver particles and a glass frit and is generally deposited by screen printing. The metal connector is in particular made of chromium-containing steel. The solder alloy is in particular based on tin, silver and copper.

In this last embodiment, the glazing is preferably a back window. The glazing then generally comprises a single thermally tempered glass sheet. Alternatively, it can be a laminated glazing, the glass sheet not being thermally tempered but being adhesively bonded to another glass sheet.

The glazing according to the invention can also be a roof of a motor vehicle. The glazing then preferably comprises a single thermally tempered glass sheet. In this embodiment, the underlayer is preferably positioned in the whole of the enameled zone in order to prevent breakage of the roof due to impacts, for example from stones or hailstones.

The glazing according to the invention can also be a windshield. In this case also, the underlayer is preferably positioned in the whole of the enameled zone in order to improve the resistance of the windshield to chipping. In this case, the glazing is preferably a laminated glazing, the glass sheet not being thermally tempered. The enamel layer is then generally located on face 2, thus in contact with the lamination interlayer.

The examples which follow illustrate the invention in a nonlimiting manner.

EXAMPLE 1

In this example, a silica underlayer with a thickness of 70 nm was deposited by cathode sputtering on a sheet of clear soda-lime-silica glass with a thickness of 3.85 mm sold by the applicant company under the Planiclear reference. A layer of black enamel (Ferro 14501) with a wet thickness of 25 μm was subsequently deposited by screen printing on the underlayer. The glass sheet thus coated was subsequently tempered after heat treatment at 650° C. for 180 seconds.

In a comparative example C1, the enamel was deposited directly in contact with the glass.

Thirty samples having a size of 70*70 mm$^2$ were subsequently subjected to three-point bending tests.

FIG. 1 represents the results of the tests in the form of a graph indicating the probability of failure (denoted P) as a function of the stress (denoted S) in MPa. The results show that the presence of the underlayer makes it possible to improve the mechanical strength of the enameled glass.

EXAMPLE 2

This example differs from example 1 in that the nature of the underlayer was a sol-gel silica layer.

The deposition of the underlayer was carried out by centrifugation (spin coating) under the following conditions: 3 ml of sol and speed of 1000 revolutions per minute. The underlayer was subsequently dried at 180° C. for 10 minutes before the enamel deposition. The starting sol comprised 18 g of methyltriethoxysilane, 15 g of isopropanol and 5 g of water acidified to pH 2. The sol was diluted to 66% in water at pH 2 after hydrolysis at ambient temperature.

In comparative example C2, the enamel was deposited directly on the glass.

FIG. 2 represents the results of the tests in the form of a graph indicating the probability of failure (denoted P) as a function of the stress (denoted S) in MPa.

The results show that the presence of the underlayer makes it possible to improve the mechanical strength of the enameled glass.

The invention claimed is:

1. A material comprising a glass sheet, one face of which comprises an enameled zone coated with an opaque enamel layer and a nonenameled zone, an underlayer which is not an enamel layer being positioned solely in at least a part of the enameled zone, under said enamel layer and in contact therewith.

2. The material as claimed in claim 1, wherein the enameled zone represents between 2% and 25% of a surface area of the coated face.

3. The material as claimed in claim 2 wherein the enameled zone is provided in the form of a peripheral strip.

4. The material as claimed in claim 1, wherein the nonenameled zone is uncoated.

5. The material as claimed in claim 1, wherein the underlayer is in contact with the glass sheet.

6. The material as claimed in claim 1, wherein the underlayer is positioned in the whole of the enameled zone.

7. The material as claimed in claim 1, wherein the underlayer is based on an oxide, a nitride or an oxynitride.

8. The material as claimed in claim 7, wherein the underlayer is based on silicon oxide.

9. The material as claimed in claim 1, wherein the underlayer is devoid of coloration.

10. The material as claimed in claim 1, wherein the underlayer is a single layer.

11. The material as claimed in claim 1, wherein the underlayer is a sol-gel layer.

12. The material as claimed in claim 11, wherein the sol-gel layer is based on, or is constituted of, silicon oxide.

13. The material as claimed in claim 1, wherein the thickness of the underlayer is between 10 nm and 1 μm.

14. A process for obtaining a material as claimed in claim 1, comprising depositing an underlayer on a part of a face of a glass sheet and then depositing an opaque enamel layer in at least the zone coated with the underlayer.

15. The process as claimed in claim 14, wherein the deposition of the underlayer is carried out by a sol-gel process, by cathode sputtering or by chemical vapor deposition.

16. A glazing comprising a material as claimed in claim 1.

17. The glazing as claimed in claim 16, wherein the glazing is a back window, a roof or a windshield of a motor vehicle.

* * * * *